United States Patent [19]

Favalora

[11] Patent Number: 5,068,496
[45] Date of Patent: Nov. 26, 1991

[54] SNAP-IN CONNECTOR

[75] Inventor: Mark L. Favalora, Niantic, Conn.

[73] Assignee: Hubbell Incorporated, Orange, Conn.

[21] Appl. No.: 607,280

[22] Filed: Oct. 31, 1990

[51] Int. Cl.[5] ............................................. H02G 3/22
[52] U.S. Cl. ................................. 174/65 R; 285/162; 285/206
[58] Field of Search ............. 174/65 R; 285/162, 161, 285/194, 205, 206, 207, 921, 319, 210

[56] References Cited

U.S. PATENT DOCUMENTS

| | | | |
|---|---|---|---|
| 330,502 | 11/1885 | McFarland | 285/210 |
| 531,425 | 12/1894 | Porteous | 285/210 |
| 1,215,595 | 2/1917 | Weikert et al. | |
| 3,154,281 | 10/1964 | Frank | 248/220.3 |
| 3,814,467 | 6/1974 | Van Buren, Jr. | 285/92 |
| 3,993,333 | 11/1976 | Biswas | 285/45 |
| 4,012,578 | 3/1977 | Moran et al. | 174/51 |
| 4,141,477 | 2/1979 | Hengesbach | 222/569 |
| 4,219,222 | 8/1980 | Brusadin | 285/8 |
| 4,225,162 | 9/1980 | Dola | 285/161 |
| 4,234,218 | 11/1980 | Rogers | 285/162 |
| 4,248,131 | 2/1981 | Larro | 411/15 |
| 4,293,151 | 10/1981 | Manzel | 285/162 X |
| 4,299,363 | 11/1981 | Datschefski | 248/56 |
| 4,468,535 | 8/1984 | Law | 174/65 R |
| 4,494,779 | 1/1985 | Neff et al. | 285/159 |
| 4,578,528 | 3/1986 | Borsh et al. | 174/65 G |
| 4,621,166 | 11/1986 | Neuroth | 174/65 R |
| 4,641,863 | 2/1987 | Shemtov | 285/158 |
| 4,666,190 | 5/1987 | Yamabe et al. | 285/93 |
| 4,711,472 | 12/1987 | Schnell | 285/162 |
| 4,864,080 | 9/1989 | Fochler et al. | 174/65 G |
| 4,880,387 | 11/1989 | Stikeleather et al. | 439/98 |
| 4,881,662 | 11/1989 | Tallman | 222/81 |
| 4,885,429 | 12/1989 | Schnittker | 174/65 SS |

FOREIGN PATENT DOCUMENTS

| | | | |
|---|---|---|---|
| 300546 | 9/1917 | Fed. Rep. of Germany | 285/162 |
| 13936 | of 1908 | United Kingdom | 285/162 |

Primary Examiner—Harold Broome
Assistant Examiner—David A. Tone
Attorney, Agent, or Firm—Jerry M. Presson; Alfred N. Goodman

[57] ABSTRACT

A connector for coupling an electrical conduit to a support, such as junction box, having variable thickness. The connector includes a one-piece tubular body member with resilient legs having locking tongues, external threads, and a receiving formation for receiving the conduit; and a one-piece take-up nut with an abutment surface and internal threads for engaging the external threads of the body member. The resilient legs are snapped into the support, and the take-up nut is screwed onto the body, clamping the support between the locking tongues of the legs and the abutment surface of the take-up nut. The electrical conduit is frictionally retained in an annular recess in the body member or is threadedly retained within the hollow portion of the body member or within the take-up nut. The conduit is a sheath, cable, or other suitable signal line.

31 Claims, 3 Drawing Sheets

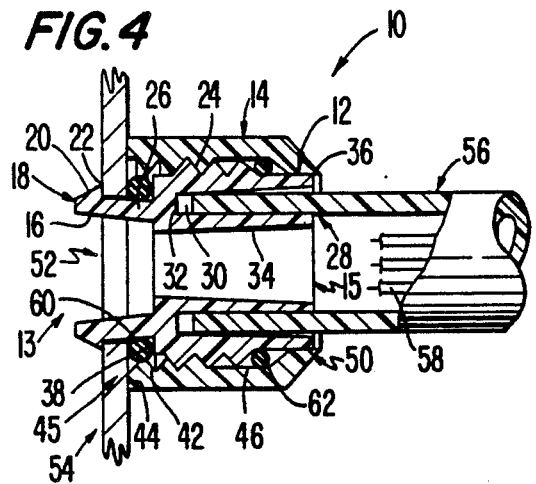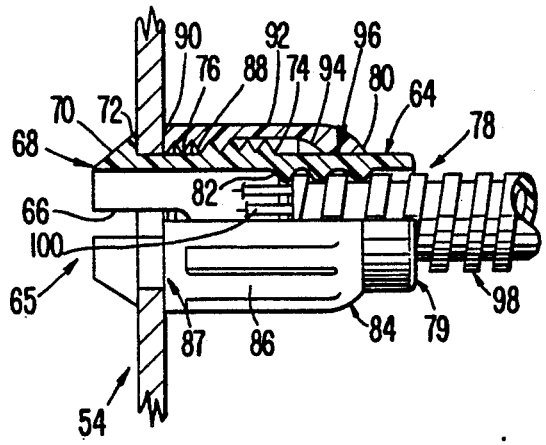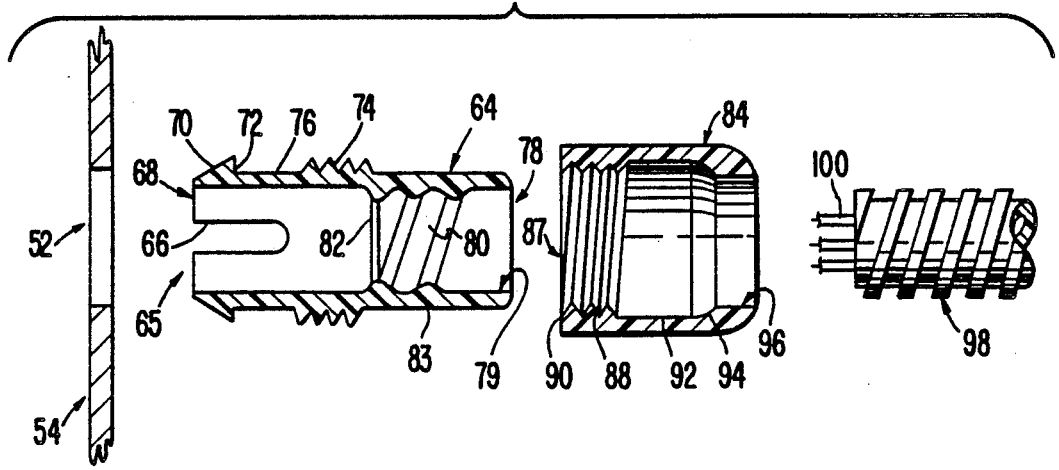

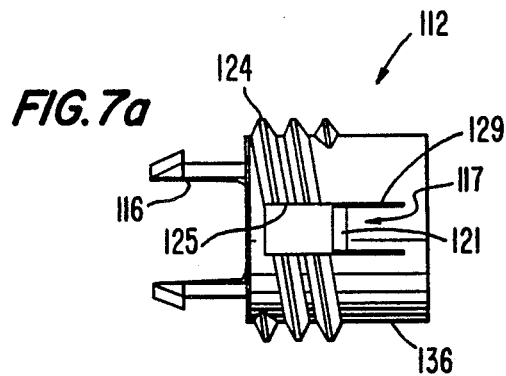
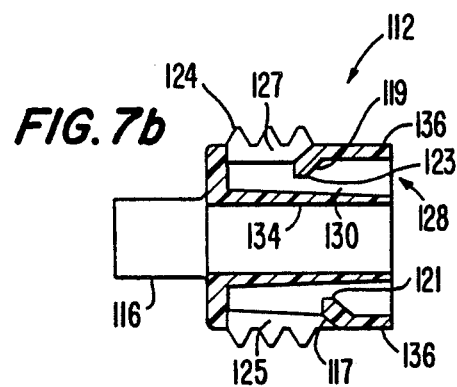
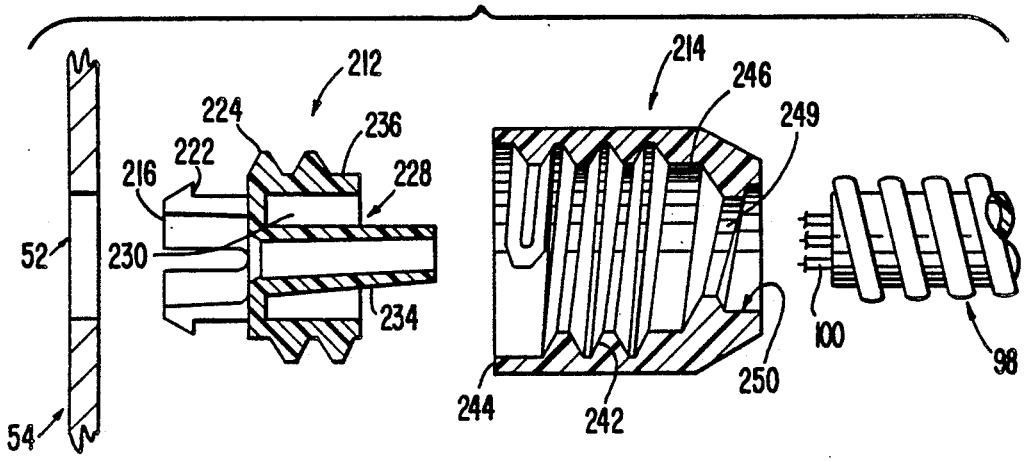

SNAP-IN CONNECTOR

FIELD OF THE INVENTION

The invention relates to a connector for coupling an electrical conduit to a support. More particularly, the invention relates to a connector having a one-piece tubular body member with a plurality of resilient legs with locking tongues, external threads, and a receiving formation for receiving the electrical conduit; and a one-piece take-up nut with an abutment surface and internal threads for engagement with the external threads of the body member. The connector clamps the support between the locking tongues and the abutment surface.

BACKGROUND OF THE INVENTION

In building construction, utility signal lines are typically encased by a protective sheath to avoid damage from contact with other building components. Electrical cables are generally covered with a flexible cladding or conduit which carries a plurality of conductors throughout the building between terminal connections or junction boxes. The conductors are fed through an aperture in a support or junction box, and the conduit is fastened to the box to hold the conductors securely in place.

In the past, threaded bushings or locking collars have been used to retain the electrical conduit in a support. Many of the connectors are secured in the aperture of the support by threads, which requires extra installation time to align and turn the connector in place. Other connectors snap in place and retain the side walls of the aperture in a preformed groove, which limits use of the connectors to certain wall thicknesses. Many connectors also have an excessive number of parts, for example, a bushing, a washer, and a third clamping member, which complicate installation and increase cost.

Examples of these prior connectors are disclosed in the following patents: British Patent No. 13,936; German Pat. No. 300,546; and U.S. Pat. Nos. 4,885,429 to Schnittker; 3,814,467 to VanBuren, Jr.; 4,234,218 to Rogers; 4,864,080 to Fochler et al; 4,248,131 to Larro; 4,578,528 to Borsh et al; 4,494,779 to Neff et al; 4,468,535 to Law; 4,141,477 to Hengesbach; 1,215,595 to Weikert et al; 4,219,222 to Brusadin; 4,225,162 to Dola; 4,666,190 to Yamabe et al; 4,711,472 to Schnell; 4,299,363 to Datschefski; 3,993,333 to Biswas; 4,881,662 to Tallman; 4,621,166 to Neuroth; 4,641,863 to Shemtov; 4,012,578 to Moran et al; 4,880,387 to Stikeleather et al; and 3,154,281 to Frank.

SUMMARY OF THE INVENTION

Accordingly, it is a primary object of the invention to provide a durable connector capable of securely coupling a flexible electrical conduit to a support.

Another object of the invention is to provide a connector that can be installed quickly and easily.

Another object of the invention is to provide a connector that accommodates various thicknesses of the support, and thus provides versatility in application.

A further object of the invention is to provide a connector that is relatively inexpensive because it requires only two parts.

The foregoing objects are basically attained by providing a connector for coupling an electrical conduit to a support having an aperture, the combination comprising a one-piece tubular body member with first and second ends having a plurality of resilient legs with radially extending locking tongues thereon, the legs being located at the first end and being adapted to extend through the aperture, external threads disposed between the first and second ends, and receiving means disposed on the second end, for receiving the conduit therein; and a one-piece, tubular take-up nut with first and second ends having an abutment surface disposed on the first end of the nut, and internal threads disposed between the first and second ends of the nut threadedly engaging the external threads on the body member, whereby the locking tongues and the abutment surface clamp opposing sides of the support adjacent the aperture.

Other objects, advantages, and salient features of the invention will become apparent from the following detailed description, which, taken in conjunction with the annexed drawings, discloses preferred embodiments of the invention.

DRAWINGS

Referring now to the drawings which form part of this original disclosure:

FIG. 4 is a side elevational view in longitudinal section of the connector with liquidtight seals;

FIG. 5 is a side elevational view in longitudinal section showing a slightly modified embodiment of the connector in which the electrical conduit is retained within the hollow body member;

FIG. 6 is an exploded side elevational view in longitudinal section of the two-piece connector and electrical conduit as shown in FIG. 5;

FIGS. 7a and 7b are a side elevation and longitudinal section of a modification of the body member shown in FIGS. 1-3; and FIG. 8 an exploded view in longitudinal section of further modifications of the body member and take-up nut as shown in FIG. 3.

DETAILED DESCRIPTION OF THE INVENTION

Figure 1:
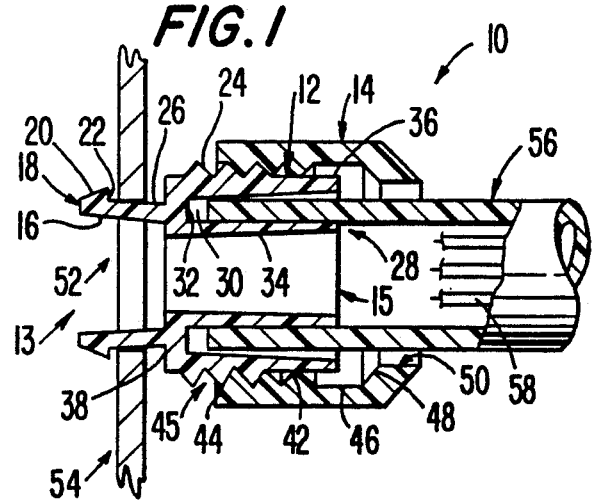
FIG. 1 is a side elevational view in longitudinal section of the connector in accordance with the invention with the electrical conduit inserted in the body member, and the take-up nut about to be clamped on the support.
Figure 2:
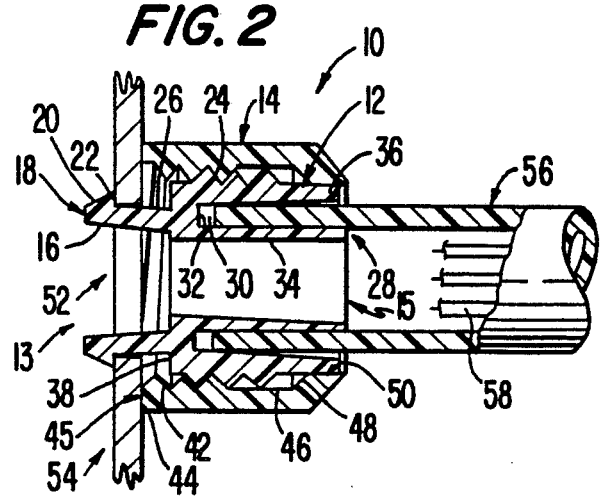
FIG. 2 is a side elevational view of the connector in longitudinal section with the electrical conduit retained within the body member and the support clamped between the locking tongues and abutment surface of the nut.
Figure 3:
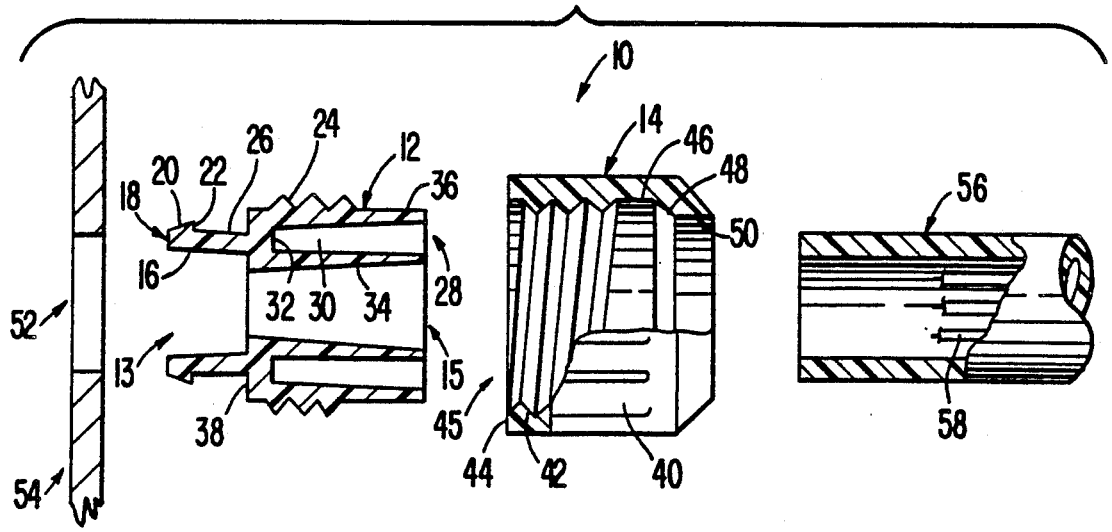
FIG. 3 is an exploded side elevational view in longitudinal section of the two parts of the connector and electrical as shown in FIGS. 1 and 2.

As seen in FIGS. 1-3, electrical connector 10 in accordance with the invention comprises a one-piece tubular body member 12 threadedly coupled with a take-up nut 14 to couple conduit 56 to support 54. The body member 12 and take-up nut 14 may be made of any conventional material such as plastic or metal, but are preferably made of polyvinylchloride (PVC) or nylon.

Tubular body member 12 is integrally formed from one piece of material, such as plastic, and is hollow with two opposed open ends, first end 13 and second end 15, and a longitudinal axis running therethrough. A plurality of resilient legs 16, preferably two, extend from first end 13. Each resilient leg 16 has an axially extending locking tongue 18 with a radially inwardly tapered sliding face 20 and a radially extending locking shoulder 22. Between the ends of the tubular body member 12, there are external threads 24 spaced from locking shoulders 22 of locking tongues 18 by a generally cylindrical intermediate region 26 which may taper inwardly. The second end 15 of body member 12 has a receiving formation 28 formed as an annular recess 30 with radially inwardly and outwardly tapered resilient walls. Recess 30 has an annular bottom wall 32, a radially outwardly tapered inside wall 34 and a radially inwardly tapering outside wall 36. Receiving formation 28 also provides an annular radially extending stop shoulder 38 located between external threads 24 and intermediate region 26.

Take-up nut 14 is a one-piece, tubular member integrally formed of plastic, for example, and has exterior gripping ridges 40 to facilitate turning. Nut 14 has internal threads 42 located between a first open end 45 having an annular, radially extending abutment surface 44 and a second open end 50. A cylindrical intermediate region 46 spaces internal threads 42 from second end 50 and is connected to second end 50 by an angled, preferably radially inwardly tapering frustoconical, surface 48.

In operation, body member 12 is snapped into a preferably circular aperture 52 in support 54, such as a junction box. Resilient legs 16 are pressed against the sides of aperture 52 which allows tapered sliding face 20 to slide into aperture 52 and snap in place by being retained by locking shoulders 22. The intermediate region 26, defined between locking shoulders 22 and stop shoulder 38, accommodates various thicknesses of support 54, as clearly shown in FIG. 1. Once body member 12 is retained in aperture 52, take-up nut 14 is partially threaded onto second end 15 of body member 12 by engaging internal threads 42 with external threads 24. Electrical conduit 56 is then moved into receiving formation 28. Conventional flexible sheath or conduit material, such as PVC, encases conductors 58 which will ultimately extend through aperture 52 in support 54.

The conduit 56 is shown as a smooth-walled tube, but it is contemplated that recess 30 in receiving formation 28 can accommodate any conventionally configured sheath. Thus, conduit 56 is moved into receiving formation 28 and is received in recess 30 between inside wall 34 and outside wall 36. Once conduit 56 is in place in recess 30, take-up nut 14 is completely screwed onto body member 12. As shown in FIG. 2, take-up nut 14 travels along the longitudinal axis of body member 12 toward support 54 and locking shoulders 22. The exterior diameter of the second end 15 of the body member 12 is less than the interior diameter of intermediate region 46 of take-up nut 14, but greater than the interior diameter of second end 50 of take-up nut 14. Thus, as nut 14 moves along body member 12, outside wall 36 of receiving formation 28 abuts angled surface 48 at the second end 50 of take-up nut 14. Angled surface 48 acts to squeeze resilient walls 34 and 36 of recess 30 to fit within the second end 50 of take-up nut 14. The squeezing action clamps conduit 56 between walls 34 and 36 in recess 30 and provides a secure friction interlock between conduit 56 and body member 12. Take-up nut 14 is rotated along body member 12, until abutment surface 44 reaches and abuts support 54, thus clamping support 54 between locking shoulders 22 and abutment surface 44.

It can be seen in FIGS. 1 and 2 that various thicknesses of support 54 will be accommodated between locking shoulders 22 and abutment surface 44, and that the connector may be adjusted for different supports by merely rotating take-up nut 14 along body member 12. Thus, the engagement of external threads 24 of body member 12 and the internal threads 42 of take-up nut 14 provides two functions, one being the clamping action of abutment surface 44 and locking shoulders 22, and the other being the squeezing action of inside wall 34 and outside wall 36 by the second end 50 of take-up nut 14. The threading action of take-up nut 14, therefore, serves to clamp body member 12 to support 54 and to conduit 56.

To achieve a liquidtight connection for the electrical conduit, means for sealing is provided. As seen in FIG. 4, which represents the connector elements described with reference to FIGS. 1-3, an elastomer gland or sealing ring 60 is provided around intermediate region 26 and adjacent stop shoulder 38 of body member 12. An additional sealing ring 62 is also provided around body member 12 on outside wall 36 of receiving formation 28. Sealing ring 60 effectuates a seal between body member 12 and support 54. Sealing ring 62 effectuates a seal between outside wall 36 of body member 12 and intermediate region 46 of take-up nut 14. The seals prevent leakage at the connection between electrical conduit 56 and junction box 54.

EMBODIMENT OF FIGS. 5-6

FIGS. 5 and 6 show a modification of the connector which includes hollow body member 64, take-up nut 84, and conduit 98, coaxially aligned about a longitudinal axis with aperture 52 in a support 54, such as junction box.

Body member 64 has resilient legs 66 with a plurality of locking tongues 68, each having a radially inwardly tapered sliding face 70 and a radially extending locking shoulder 72 extending from first open end 65. External threads 74 are spaced from locking shoulders 72 by a cylindrical intermediate region 76. Receiving formation 78 comprises internal spiral grooves 80 and an annular stop ledge 82, with an exterior cylindrical surface 83 extending from threads 74 to second open end 79 of body member 64.

Take-up nut 84 is similar to nut 14 shown in FIGS. 1-3. Nut 84 has exterior gripping ridges 86 and interior threads 88 with an annular, radially extending abutment surface 90 on open first end 87. Internal threads 88 are spaced from the second end 96 by a cylindrical intermediate region 92. Intermediate region 92 is connected to open second end 96 of nut 84 by an angled, preferably frustoconical, surface 94.

In operation, the embodiment of FIG. 5 functions similarly to the embodiment of FIG. 1. Take-up nut 84 screws onto body member 64, clamping support 54 between locking shoulders 72 and abutment surface 90. Again, intermediate region 76 accommodates various thicknesses of support 54. Receiving formation 78 is modified to comprise internal grooves 80 for receiving a flexible helical electrical conduit 98. Conduit 98 carries a plurality of electrical conductors 100, and is made of a flexible material. The helical configuration adds to the flexibility of the conduit.

The ridges of helical conduit 98 are retained in internal grooves 80 of body member 64 as shown clearly in FIG. 5. Conduit 98 is attached to body member 64 by turning it within hollow member 64 to engage grooves 80. Stop ledge 82 prevents the conduit from protruding into the aperture 52 of support 54. In this case, conduit 98 may be coupled to body member 64 either before or after take-up nut 84 is secured to body member 64, thus clamping support 54 between locking shoulders 72 and abutment surface 90. Resilient legs 66 are snapped into aperture 52 in the same manner as the resilient legs 16 of the first embodiment are snapped in place. As discussed, tapered sliding face 70 slides against the walls of aperture 52, allowing resilient tongues 68 to slide through aperture 52 and be retained in support 54 by locking shoulders 72. In this embodiment, the exterior diameter of the second end 79 of the body member 12 is less than the interior diameter of intermediate region 92 of take-up nut 84, but substantially the same as the interior diameter of second end 96 of take-up nut 84. The second end 96 of take-up nut 84 provides lateral support to the clamped assembly. Seals 60 and 62, described with respect to FIG. 4, can also be used in the embodiment of FIG. 5 to effectuate a liquidtight connection.

EMBODIMENT OF FIGS. 7a–7b

FIGS. 7a and 7b show a modified body member 112 which is substantially the same as body member 12 shown in FIGS. 1-3 with the addition of locking tabs 117 and 119. Accordingly, the elements of body member 112 which are the same as corresponding body member 12 will not be discussed in detail.

Hollow body member 112, having resilient legs 116, external threads 124, and receiving formation 128, has at least two resilient elongate locking tabs 117 and 119 which are integrally formed in radially inwardly tapering outside wall 136 of annular recess 130. Locking tabs 117 and 119 are molded in body member 112 or cut from outside wall 136. Tabs 117 and 119 have interiorly protruding pointed fingers 121 and 123, respectively. Longitudinally extending slits 129 form two opposed sides of each tab and extend from fingers 121 and 123 into outside wall 136. Adjacent tabs 117 and 119 are generally rectangular slots 125 and 127, respectively.

Slits 129 allow tabs 117 and 119 to act as living hinges. When a conduit is inserted into annular recess 130, tabs 117 and 119 are deflected out of recess 130 into slots 125 and 127. However, protruding fingers 121 and 123 still contact the inserted conduit, gripping the conduit and pressing it against inside wall 134 of recess 130.

As discussed with respect to the connector of FIGS. 1-3, the conduit may be smooth-walled or helically grooved. In operation, a take-up nut, such as take-up nut 14 shown in FIG. 3, is screwed over body member 112, and acts to further press locking tabs 117 and 119 against the inserted conduit.

EMBODIMENT OF FIG. 8

FIG. 8 discloses an exploded view of a further modification of the connector according to the invention. Body member 212 is substantially the same as body member 12 of FIGS. 1-3, except for the truncation of outside wall 236. Take-up nut 214 is also substantially the same as take-up nut 14 shown in FIGS. 1-3, with the addition of interior conduit thread 249 in second end 250. Accordingly, the elements of body member 212 and take-up nut 214 previously described with respect to body member 12 and take-up nut 14 will not be discussed in detail.

Hollow body member 212 has resilient legs 216 for insertion into aperture 52 in support 54, external threads 224 to receive take-up nut 214, and receiving formation 228 for securing conduit 98 thereto. Receiving formation 228 is an annular recess 230 having radially outwardly tapered inside wall 234 and truncated radially inwardly tapered outside wall 236.

Take-up nut 214, with internal threads 242 and abutment surface 244, has an additional conduit thread 249 in second end 250. The diameter of thread 249 is smaller than the diameter of threads 242, and the diameter of second end 250 is smaller than the diameter of second end 50 in nut 14 shown in FIGS. 1-3. Conduit thread 249 connects planar intermediate region 246 inside take-up nut 214 to constricted second end 250 and is adapted to threadedly receive the helical sheath of conduit 98.

In operation, body member 212 is inserted into aperture 52. Take-up nut 214 is threaded onto body member 212 by engaging internal threads 242 with external threads 224. Conduit 98 is threaded into second end 250 of take-up nut 214 by engaging conduit thread 249 with the helical wrap of conduit 98 at any point during assembly. Ultimately, take-up nut 214 is screwed completely over body member 212 until support 54 is clamped between locking shoulders 222 of resilient legs 216 and abutment surface 244, and conduit 98 is threaded in take-up nut 214 and received in recess 230 of receiving formation 228 in body member 212. As can be understood by FIG. 8, truncated outside wall 236 of body member 212 allows conduit thread 249 free access for engagement with the helical surface of conduit 98, and inside wall 234 provides internal support to conduit 98 for a secure interlock.

Sealing rings 60 and 62 shown in FIG. 4 may also be utilized in the embodiments of FIGS. 7a and 7b and FIG. 8 to effectuate a liquidtight joint.

While advantageous embodiments have been chosen to illustrate the invention, it will be understood by those skilled in the art that various changes and modifications can be made therein without departing from the scope of the invention as defined in the appended claims.

What is claimed is

1. A connector for coupling an electrical conduit to a support having an aperture, the combination comprising:
    a one-piece, tubular body member with a longitudinal axis and first and second ends having ,
        a plurality of resilient legs with radially extending locking tongues thereon, said legs being located at said first end and being adapted to extend through the aperture,
        external threads disposed between said first and second ends, and
        receiving means, disposed on said second end, for receiving the conduit therein; and
    a one-piece, tubular take-up nut with first and second ends having
        an abutment surface disposed on said first end of said nut, and
        internal threads disposed between said first and second ends of said nut and threadedly engaging said external threads on said body member,
    whereby said locking tongues and said abutment surface can clamp opposing sides of the support adjacent the aperture.

2. A connector according to claim 1, wherein each of said locking tongues comprises
    an exterior tapered face tapering inwardly toward said longitudinal axis, and
    a locking shoulder extending radially outward from said leg and meeting said tapered face.

3. A connector according to claim 2, wherein said external threads are spaced from said locking shoulder by a first intermediate region.

4. A connector according to claim 3, wherein said internal threads are spaced from said second end of said nut by a second intermediate region.

5. A connector according to claim 4, wherein said tubular body member has a first exterior diameter;
said second end of said nut has a second interior diameter, substantially the same as said first diameter;
said second intermediate region has a third interior diameter, greater than said first and second diameters,
said second intermediate region being joined to said second end of said nut by an angled surface.

6. A connector according to claim 4, wherein said body member has a first exterior diameter;
said second end of said nut has a second interior diameter, less than said first diameter;
said second intermediate region has a third interior diameter, greater than said first diameter,
said second intermediate region being joined to said second end of said nut by an angled surface.

7. A connector according to claim 1, wherein said second end of said nut receives said second end of said body member.

8. A connector according to claim 1, wherein said receiving means comprises
internal receiving grooves for coupling said body member to the conduit.

9. A connector according to claim 8, and further comprising
a stop ledge within said tubular body member and spaced from said second end by said internal grooves.

10. A connector according to claim 1, wherein said receiving means comprises
at least one annular recess extending substantially coaxially with said longitudinal axis and forming an inside wall and an outside wall, said recess adapted to receive the conduit.

11. A connector according to claim 10, wherein said inside and outside walls are annular.

12. A connector according to claim 10, wherein said outside wall is resilient.

13. A connector according to claim 10, wherein said recess has a bottom wall and at least one of said inside or outside walls tapers from said bottom wall.

14. A connector according to claim 10, wherein said external threads of said body member are located on said outside wall.

15. A connector according to claim 10, wherein said outside wall terminates in a stop shoulder spaced from and facing said locking tongues.

16. A connector according to claim 10, wherein said outside wall abuts and is received by said second end of said nut when the support is clamped between said locking tongues and said abutment surface.

17. A connector according to claim 10, wherein said outside wall has at least one resilient locking tab.

18. A connector according to claim 17, wherein said locking tab is integrally formed with said outside wall.

19. A connector according to claim 17, wherein said locking tab is hinged to said outside wall.

20. A connector according to claim 17, wherein said locking tab has a finger protruding into said recess for engagement with the conduit.

21. A connector according to claim 10, wherein said outside wall is truncated.

22. A connector according to claim 10, wherein said inside wall extends longitudinally away from said resilient legs and beyond said outside wall.

23. A connector according to claim 1, wherein said receiving means has at least one resilient locking tab.

24. A connector according to claim 1, wherein said second end of said take-up nut h as an interior conduit thread for engagement with the conduit.

25. A connector according to claim 1, and further comprising
sealing means for forming a liquidtight connection between the conduit and the support.

26. A connector according to claim 25, wherein said sealing means comprises
a sealing ring disposed around said resilient legs for sealing between said body member and the support; and
a second sealing ring disposed around said receiving means for sealing between said body member and said nut.

27. A method for connecting an electrical conduit to an aperture in a support, comprising the steps of
pressing a hollow body member, having resilient legs with locking tongues, into the aperture,
screwing a take-up nut partially onto the body member,
coupling the conduit to the body member, and
screwing the take-up nut over the body member toward the locking tongues until the take-up nut engages the support and the locking tongues engage the support,
thereby securing the support between the end of the take-up nut and the locking tongues.

28. A method according to claim 27, wherein the coupling step comprises
inserting the conduit into the body member, and
squeezing the body member into tight engagement with the conduit while screwing the take-up nut over the body member toward the locking tongues.

29. A method according to claim 27, wherein the coupling step comprises
inserting the conduit into a recess having protruding resilient locking tabs in the body member, and
deflecting the locking tabs from the recess with the conduit, and
gripping the conduit in the recess with the locking tabs.

30. A method according to claim 27, wherein the coupling step comprises
inserting the conduit into the hollow body member and relatively rotating the conduit and the body member.

31. A method according to claim 27, wherein prior to coupling the conduit to the body member, further comprising the step of
threadedly coupling the conduit to the take-up nut.

* * * * *